(12) United States Patent
Gustafsson

(10) Patent No.: US 10,038,723 B2
(45) Date of Patent: Jul. 31, 2018

(54) METHOD AND APPARATUS FOR RELIABLE TOKEN REVOCATION

(71) Applicant: Telefonaktiebolaget L M Ericsson (publ), Stockholm (SE)

(72) Inventor: Greger Gustafsson, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 240 days.

(21) Appl. No.: 14/937,800

(22) Filed: Nov. 10, 2015

(65) Prior Publication Data

US 2017/0134429 A1     May 11, 2017

(51) Int. Cl.
*H04L 29/06* (2006.01)
*H04L 9/32* (2006.01)

(52) U.S. Cl.
CPC ............ *H04L 63/20* (2013.01); *H04L 9/3268* (2013.01); *H04L 63/062* (2013.01); *H04L 63/10* (2013.01); *H04L 63/108* (2013.01)

(58) Field of Classification Search
CPC ....... H04L 63/20; H04L 63/10; H04L 63/108; H04L 63/062; H04L 9/0891; H04L 9/3268
See application file for complete search history.

(56) References Cited

U.S. PATENT DOCUMENTS

| | | | | | |
|---|---|---|---|---|---|
| 5,999,711 | A * | 12/1999 | Misra | ...................... | G06F 21/33 719/310 |
| 6,092,201 | A * | 7/2000 | Turnbull | .................. | G06F 21/51 380/231 |
| 6,216,231 | B1 * | 4/2001 | Stubblebine | ............ | G06F 21/33 713/156 |
| 6,397,329 | B1 * | 5/2002 | Aiello | ................... | H04L 9/3265 713/155 |
| 7,047,404 | B1 * | 5/2006 | Doonan | .................. | G06F 21/64 380/30 |
| 7,124,295 | B1 | 10/2006 | Zhao | | |
| 7,313,689 | B2 * | 12/2007 | Falch | ................. | G06Q 20/3829 380/277 |
| 7,356,693 | B2 * | 4/2008 | Kivinen | .................. | H04L 9/006 713/155 |

(Continued)

OTHER PUBLICATIONS

Mohamed M. E. A. Mahmoud et al., "Efficient Public-Key Certificate Revocation Schemes for Smart Grid", 2013 IEEE Communications Conference (GLOBECOM), IEEE, vol. pat. Dec. 9, 2013, pp. 778-783.

*Primary Examiner* — Linglan E Edwards
(74) *Attorney, Agent, or Firm* — Nicholson De Vos Webster & Elliott LLP

(57) ABSTRACT

Methods and systems for reliable token revocation at a server are described. The server receives, a token revocation policy, which includes an identification of a set of users for which a set of associated tokens are to be revoked. The server receives, from a first client device, a first request to access resources at the server, the first request including a first token generated at the token authority server for the client device, wherein the first token is associated with a first expiration time interval; and denies access to the resources at the server based on the first token and the token revocation policy, prior to an expiration of the first expiration time interval associated with the first token.

9 Claims, 5 Drawing Sheets

(56) References Cited

U.S. PATENT DOCUMENTS

| | | | | |
|---|---|---|---|---|
| 8,032,744 B2* | 10/2011 | Doonan | ............... | G06F 21/64 |
| | | | | 380/286 |
| 8,209,531 B2* | 6/2012 | Gentry | ............... | H04L 9/3236 |
| | | | | 713/158 |
| 8,955,084 B2 | 2/2015 | Do et al. | | |
| 9,172,543 B2* | 10/2015 | Wnuk | ............... | H04L 9/3268 |
| 9,628,448 B2* | 4/2017 | Hayton | ............... | G06F 21/31 |
| 2002/0146132 A1 | 10/2002 | Medvinsky | | |
| 2004/0210597 A1 | 10/2004 | Wanish | | |
| 2013/0268645 A1* | 10/2013 | Shah | ............... | H04L 41/0273 |
| | | | | 709/223 |
| 2014/0068700 A1* | 3/2014 | Reilly | ............... | H04L 63/20 |
| | | | | 726/1 |
| 2014/0281525 A1 | 9/2014 | Acar et al. | | |
| 2015/0236861 A1* | 8/2015 | Engberg | ............... | H04L 9/3268 |
| | | | | 713/156 |
| 2017/0126685 A1* | 5/2017 | Taylor | ............... | H04L 63/10 |

* cited by examiner

Receive, a token revocation policy, which includes an identification of a set of one or more users for which a set of one or more associated tokens are to be revoked, wherein the set of tokens was generated at a token authority server in response to requests from one or more client devices of the set of users and enable the client devices to access resources at the server for determined periods of time identified by a set of expiration time intervals respectively associated with the set of tokens
210

Receive, from a first client device, a first request to access resources at the server, the first request including a first token generated at the token authority server for the client device, wherein the first token is associated with a first expiration time interval
220

Deny access to the resources at the server based on the first token and the token revocation policy, prior to an expiration of the first expiration time interval associated with the first token
230

The identification of the set of users includes a set of one or more individual identifiers for respectively identifying the one or more users
240

The identification of the set of users includes a predetermined number of users associated with a predetermined number of tokens to be revoked during a period of time, wherein the predetermined number of users is less than all of the users accessing the server through the associated client devices during that period of time
250

The identification of the set of users includes a percentage of users for which associated tokens are to be revoked during a predetermined period of time, wherein the percentage is strictly less than one hundred percent
260

FIG. 2B

METHOD AND APPARATUS FOR RELIABLE TOKEN REVOCATION

FIELD

Embodiments of the invention relate to the field of media systems, and more specifically, to the reliable revocation of token.

BACKGROUND

Token based authentication and authorization is widely used in today's web applications. In general a token allows a user to access a specific resource—without using any other information such as a username and a password. For example, a token may be obtained by submitting a request to a token authority server. The user may be prompted to enter a username and password for authentication and retrieval of the authorization rights associated with the user's account at the token authority server. Upon determining the authorization rights of the user, the token authority server issues a token, which will enable the user to access resources at an application server for a predetermined period of time. Once the token is obtained, the user can access the resources for the predetermined time period at the server hosting the application services by including the token in each request sent to the server.

When a token is issued it includes an expiration time interval after which the token is no longer valid and would need to be renewed. Thus, each time the server hosting the application services receives a request with an invalid token (after the time interval had expired), it denies access to the resources requested by a client device and causes the client device to request a new token from the token authority server.

SUMMARY

Exemplary methods of reliable token revocation at a server include receiving, a token revocation policy, which includes an identification of a set of one or more users for which a set of one or more associated tokens are to be revoked, where the set of tokens was generated at a token authority server in response to requests from one or more client devices for the set of users and enable the client devices to access resources at the server for determined periods of time identified by a set of expiration time intervals respectively associated with the set of tokens; receiving, from a first client device, a first request to access resources at the server, the first request including a first token generated at the token authority server for the client device, where the first token is associated with a first expiration time interval; and denying access to the resources at the server based on the first token and the token revocation policy, prior to an expiration of the first expiration time interval associated with the first token.

One general aspect includes a server that is communicatively coupled to a plurality of client devices, the server including a set of one or more processors; and a non-transitory machine-readable storage medium containing code, which when executed by the set of one or more processors, causes the server to receive, a token revocation policy, which includes an identification of a set of one or more users for which a set of one or more associated tokens are to be revoked, where the set of tokens was generated at a token authority server in response to requests from one or more client devices of the set of users and enable the client devices to access resources at the server for determined periods of time identified by a set of expiration time intervals respectively associated with the set of tokens. The server is further caused to receive, from a first client device, a first request to access resources at the server, the first request including a first token generated at the token authority server for the client device, where the first token is associated with a first expiration time interval. The server is further caused to deny access to the resources at the server based on the first token and the token revocation policy, prior to an expiration of the first expiration time interval associated with the first token.

One general aspect includes a non-transitory machine-readable storage medium having computer code stored therein, which when executed by a set of one or more processors of a server that is communicatively coupled to a plurality of client devices, causes the server to perform operations including: receiving, a token revocation policy, which includes an identification of a set of one or more users for which a set of one or more associated tokens are to be revoked, where the set of tokens was generated at a token authority server in response to requests from one or more client devices of the set of users and enable the client devices to access resources at the server for determined periods of time identified by a set of expiration time intervals respectively associated with the set of tokens; receiving, from a first client device, a first request to access resources at the server, the first request including a first token generated at the token authority server for the client device, where the first token is associated with a first expiration time interval; and denying access to the resources at the server based on the first token and the token revocation policy, prior to an expiration of the first expiration time interval associated with the first token.

BRIEF DESCRIPTION OF THE DRAWINGS

The invention may best be understood by referring to the following description and accompanying drawings that are used to illustrate embodiments of the invention. In the drawings:

FIG. 2A illustrates a flow diagram of exemplary operations for reliable token revocation, in accordance with one embodiment;

FIG. 2B illustrates a flow diagram of exemplary operations for the identification of the users for whom tokens are to be revoked prior to the expiration of the tokens in accordance with some embodiments;

DESCRIPTION OF EMBODIMENTS

Figure 1:
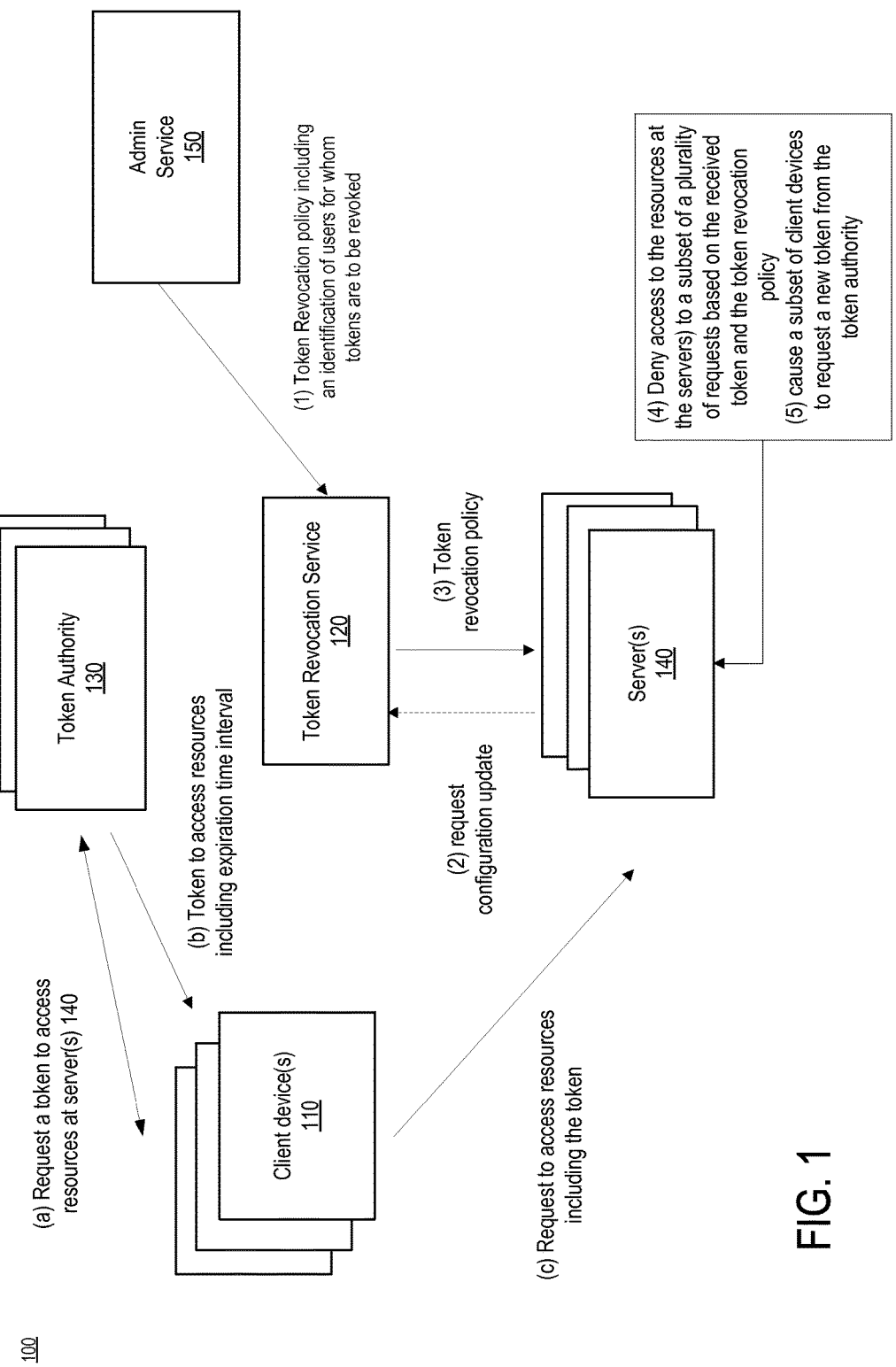
FIG. 1 is a block diagram illustrating an exemplary system for performing reliable token revocation in accordance with one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

In general a token allows a user to access a specific resource—without using any other information such as a username and a password for a predetermined period of time. For example, a token may be obtained by submitting a request from a client device to a token authority server. The user may be prompted to enter a username and password for authentication and retrieval of the authorization rights associated with the user's account at the token authority server. Upon determining the authorization rights of the user, the token authority server issues a token, which will enable the user to access resources at an application server for the predetermined period of time. Once the token is obtained, the user can access the resources for the predetermined time period at the server hosting the application services by including the token in each request sent to the server.

When a token is issued it includes an expiration time interval indicating the predetermined period of time after which the token is no longer valid and would need to be renewed by the user. Thus, each time the server hosting the application services receives a request with an invalid token (after the time interval had expired), it denies access to the resources requested by the client device and causes the client device to request a new token from the token authority server.

It is however common that the owner of a service, which provides to a plurality of customers access to resources at a server, wants to revoke prematurely either the token of a single user or the tokens of multiple users prior to the expiration of the expiration timer interval associated with the token of each user. In a first exemplary scenario, the owner or administrator of a media services (e.g., including Internet Protocol (IP) Television services, e-commerce, etc.) may desire to revoke a token of a user as the user should no longer have access to the resources. For example, the token may need to be revoked if the user ends their subscription to the services associated with the token or if the user is violating the agreement associated with their services. In another scenario the administrator/owner of the services may need to revoke several tokens in order to cause a new login sequence (e.g., in order to move multiple users from a current version of the application services to a new or updated version of the application services).

In a standard approach, in order to revoke tokens in one of the scenarios presented above, a token revocation service is used to verify whether each token needs to be revoked when the token is being validated.

This approach has scaling limitations since every request received at the server hosting the application services now needs to validate every token used against this revocation service. This implies that a considerable amount of additional processing resources is needed to perform the revocation and validation of each one of the tokens received. With this approach, each token received within a request for resources at the application server is checked for revocation, and each client device is caused to renew its token when revocation of the tokens is performed. This can result in the user base of the application services flooding the token authority server with requests for new tokens transmitted at substantially the same time.

Another approach includes a revocation of tokens based on a time at which the tokens were created. Thus in this approach a server hosting application services receiving requests from client devices causes the revocation of all tokens based on the time at which they were issued. For example, the application server may revoke all tokens which were issued prior to a given time. This approach may cause a denial of service (DoS) attack on the token authority server, as many if not all client tokens are revoked at the same time.

Techniques for reliable token revocation are described herein. According to one embodiment, an application server receives a token revocation policy. The revocation policy includes a set of one or more rules which define how the revocation policy evolves over time and what tokens are to be revoked. In some embodiments, the revocation policy includes at least one of the following rules (1) a refresh rule for the revocation policy (including action to be performed when the refresh rule cannot be applied); (2) an identification of the individual tokens to be revoked, and optionally the identification of a time period for which these tokens are to be revoked; (3) a revocation rate at which multiple tokens are to be removed over time. Thus, according to the present embodiments, instead of polling for individual token revocation on each request, the server hosting the application services receives the token revocation policy and revoke one or more token as identified by the revocation policy.

According to one embodiment, the server hosting the application services receives a token revocation policy, which includes one or more rules for progressively revoking multiple tokens respectively associated with multiple client devices. Each one of the tokens was generated at a token authority server in response to a request from an associated client device and enables the client device to access resources at the server. The server receives, from at least a client device, a request to access resources at the application device, the request including the token; and denies access to the resources at the application device based on the received token and the token revocation policy. Thus according to one embodiment, the revocation policy defines a set of one or more rules for progressively revoking multiple tokens. In a first step a first subset of tokens is revoked during a first period of time, followed with a second step at which a second subset of tokens is revoked during a second period of time following the first period of time. Thus the entire set of tokens is progressively revoked by revoking a subset of tokens at a time until all tokens are revoked without causing a DoS attack on the token authority server. The techniques presented herein ensures revocation of all the undesired tokens in a controlled manner over a period of time resulting in the protection of the system from DoS attacks.

FIG. 1 is a block diagram illustrating an exemplary system for performing reliable token revocation in accordance with one embodiment. The system 100 includes one or more client devices 110 coupled with one or more server(s) 140. The client devices 110 are further coupled with a token authority 130. The server(s) 140 are coupled with a Token revocation service 120, which is coupled with an admin service 150.

The client devices 110 are computing devices (e.g., laptops, workstations, smartphones, palm tops, mobile phones, tablets, gaming systems, set top boxes etc.) that are capable of accessing network resources (e.g., they include software such as web browsers or web applications that are capable of accessing network resources). Users at the client devices 110 request network resources (e.g., HTML pages, images, television (TV) programs, movie files, music files, or other multimedia resources) through a client network application such as a web browser or other application (e.g., FTP client, SSH client, Telnet client, etc.). Each user of the client devices has an account enabling them to access resources provided at the server(s) 140. The client devices 110 are operative to request a token associated with their account from the token authority 130. Upon receipt of a respective token each one of the client devices may request and access resources provided at the server 140.

The servers 140 are computing devices that serve network resources (e.g., HTML pages, images, television (TV) programs, movie files, music files, or other multimedia resources). The servers 130 respond to requests for network resources (e.g., from an HTTP request, FTP request, telnet request, etc.). Although not illustrated in FIG. 1, it should be understood that the network resources of the servers 130 may be stored separately from the device that responds to the requests. The servers 140 may include one or more service applications. In an embodiment, each of the service applications can be distributed on a cluster of servers. A user of a client device 110 can access a resource from the service applications by providing a request with a valid token as generated by the token authority 130 for that user. While FIG. 1 illustrates multiple servers 140, one may understand that one or more services offered to the users may be hosted on one server. In some embodiments, the users are offered multiple services, each of these services being hosted on a separate server or on a cluster of servers communicatively coupled (e.g., hosted on a cloud). Each of these services may be associated with a separate token provided to the user by the token authority, where each token enables the user to access a respective service for a determined period of time and enables the user to have a certain levels of authorization for each service. For example, one or more servers may host an IP TV service, and an e-commerce service. Each user may receive a token for the IP TV service and another token for the e-commerce service. Each of the tokens providing different levels of authorization to the user.

The token revocation service 120 is a service used to configure the server(s) 140 to include a revocation policy for revoking tokens of the users. In one embodiment, the token revocation service is part of a configuration module of the admin service 150, which is operative to configure the application services on the server 140. The admin service 150 is operated by an administrator of the application services and can be used to set up the services for the users as well as configure the token revocation policy at each one of the server(s) 140 through the token revocation service 120. The admin service 150 may be implemented on a computing device such as a cloud cluster. The token revocation service 120 may be implemented on the same computing device as the admin service 150 or alternatively on a computing device physically separate from the admin service 150 and communicatively coupled to it.

At operation (a) each one of the client devices 110 requests from the token authority the issuance of a token to access resources at one or more of the servers 140. Although not illustrated the token authority is communicatively coupled with the admin service 150 and configured with authorization and authentication conditions causing the issuance of a token to the client device when the authorization and authentication conditions are satisfied. For example, the user may submit with the request for token, a username and a password associated with the user's account to access the resources at the servers 140. The username and the password are used at the token authority to authenticate the user and to determine the authorization level privileges associated with the user for the application services. Thus, upon receipt of the request, and determining that the user is authorized to access the application services at the server 140, a token is generated and transmitted to the client device requesting the token. Each token generated includes an expiration time interval. The expiration time interval indicates that the token will be remain valid for a predetermined period of time, and during this period of time the user is allowed to access the services at the servers 140 with the authorization privileges associated with the token.

Following the receipt of respective tokens, the client devices 110 request, at operation (c), access to resources at the servers 140, where the request includes the token received from the token authority. Typically a significant number (e.g., thousands, hundreds of thousands, or millions) of requests are received at the servers 140 from the client devices 110 at a given moment in time. The servers 140 are configured with the token revocation policy as uploaded to the servers through the token service 120. The admin service 150 is used by an administrator to select one or more rules for progressively revoking a plurality of tokens over a period of time. This token policy is uploaded into each one of the servers. Once the revocation policy is configured at each one of the servers, the servers are operative to revoke tokens based on this policy.

At operation (1) the admin service 150 is used to select a token revocation policy including an identification of users for whom tokens are to be revoked and to configure the token revocation service with the selected revocation policy. An administrator or an owner of the application services running on the servers 140 uses the admin service 150 to input the identification of the users, as well as other parameters (e.g., an interval of time during which the revocation policy is to remain active, a start time for initiating the revocation policy, etc.). This policy is transmitted to the token revocation service 120 to configure the one or more servers 140 hosting the applications services. In an embodiment, the token revocation service receives at operation (2) a request for a configuration update from the servers 140, and responds in response to this request by transmitting (3) the token revocation policy. In another embodiment, the token revocation policy is immediately transmitted to the servers 140 without the receipt of a request for a configuration update from the servers 140.

The servers are configured with the token revocation policy and at operation (4) deny access to the resources to a subset of the multiple requests received from the client devices based on the received token and the token revocation policy. The subset of client devices is caused to request a new token from the token authority 130.

The operations in FIGS. 2A-2B will be described with reference to the exemplary embodiments of the FIG. 1. However, it should be understood that the operations of the flow diagrams can be performed by embodiments of the invention other than those discussed with reference to the FIG. 1, and the embodiments of the invention discussed with reference to FIG. 1 can perform operations different than those discussed with reference to the flow diagrams.

FIG. 2A illustrates a flow diagram of exemplary operations for reliable token revocation, in accordance with one embodiment. A block 210, the server(s) 140 receives, a token revocation policy. The token revocation policy includes an identification of a set of one or more users for which a set of one or more associated tokens are to be revoked. As described above, each one of the tokens from the set of tokens was generated at the token authority 130 in response to requests from the client devices (e.g., the client devices 110 of FIG. 1) of the set of users. Each token enables its associated client device to access resources at the server for a determined period of time identified by an expiration time interval associated with the token.

FIG. 2B illustrates a flow diagram of exemplary operations for the identification of the users for whom tokens are to be revoked prior to the expiration of the tokens in accordance with some embodiments. According to one embodiment, at block 240 each of the application servers 140 receives the token revocation policy including an identification of a list of users for whom tokens are to be revoked. This list of users may include one or more users identified for token revocation by the administrator through the admin service prior to the expiration of the expiration time intervals associated with the tokens of the users. The identification of the list of users includes a set of identifiers individually identifying each user. These identifiers may be an Internet Protocol address, or other identifier uniquely identifying the user of the service. For example, an employee of the admin service or of the application services may no longer be an employee and their token needs to be revoked prior to its expiration. In another example, a user of the service may have discontinued their service membership or may be in breach of the agreement with regard to the application services. In these examples, the user may have one or more associated tokens that need to be revoked immediately prior to their expiration.

In addition the revocation policy may include a start time $t_1$ and an end time $t_2$ defining a time interval between which the tokens of the users are to be revoked. For example, each server may start the revocation process at the start time $t_1$ and ends the revocation process at the end time $t_2$. Referring back to FIG. 2A, the flow of operations moves from block 210 to block 212, at which the server(s) 140 receives, from a first client device, a first request to access resources at the server. The first request includes a first token generated at the token authority server for the client device, where the first token is associated with a first expiration time interval. Thus when time $t_1$ is reached, and upon receipt of the first request from the first client device, the server 140 denies (block 212) access to the resources to this user. Following the denial of access, the client device is caused to request a new token from the token authority. The token authority may or may not grant a new token to the user. In an exemplary embodiment, the token authority may grant a new token to the user with authorization level privileges different from the authorization level privileges associated with the previous token. In an alternative embodiment, the token authority 130 does not grant a new token to the user consequently denying complete access to the application services at the servers 140 for this user upon revocation of their token. Thus in these embodiments, the token of a user is revoked based on the token revocation policy prior to the expiration of the expiration time interval associated with the token when it was generated.

Referring back to FIG. 2B, according to another embodiment, at block 250 the server 140 receives a token revocation policy including the identification of a predetermined number of users for which tokens are to be revoked during a predetermined period of time. For example, the identification of the users includes a number N of tokens to be revoked within M minutes or seconds. Thus based on this revocation policy upon receipt (at block 220) of requests including current tokens from the client devices 110, the servers 140 are operative to deny access (at block 230) to a subset of N client devices at a time causing the revocation of an equal number N of tokens. Thus at a first time a first subset of N tokens is revoked during a first period of time (of M minutes/seconds) (by denying access to N client devices requesting access to the application services at that first time), followed with a second step at which a second subset of N tokens is revoked during a second period of time following the first period of time (by denying access to N client devices requesting access to the application services at that second time). This process continues until tokens of all users of the service are revoked. Following the denial of access to a client device, the client device is caused to request a new token from the token authority. Thus the token authority receives at most N requests for new tokens following the denial of access to the N associated client devices at the server. The entire set of tokens is progressively revoked by revoking a subset of N tokens at a time until all tokens are revoked without causing a DoS attack on the token authority server. The techniques presented herein ensures revocation of all the undesired tokens in a controlled manner over a period of time resulting in the protection of the system from DoS attacks.

Referring back to FIG. 2A, in another embodiment, at block 260 the identification of the set of users included in the revocation policy includes a percentage of users for which the associated tokens are to be revoked during a predetermined period of time. Thus based on this revocation policy upon receipt (at block 220) of requests including current tokens from the client devices 110, the servers 140 are operative to deny access (at block 230) to a percentage of these client devices at a time, causing the revocation of an equal percentage of tokens. Thus at a first time a first percentage of tokens (e.g., 1%, 10%, 20%, etc. . . . ) is revoked during a first period of time (of M minutes/seconds) (by denying access to a first percentage of client devices requesting access to the application services at that first time), followed with a second step at which a second percentage of tokens is revoked during a second period of time following the first period of time (by denying access to a second percentage of client devices requesting access to the application services at that second time). The first percentage may be equal or different from the second percentage. This process continues until all tokens are revoked. Following the denial of access to a client device, the client device is caused to request a new token from the token authority. Thus the token authority receives at most a subset of requests for new tokens following the denial of access to the percentage of client devices at the server. The entire set of tokens is progressively revoked by revoking a percentage of the tokens at a time until all tokens are revoked without causing a DoS attack on the token authority server. The techniques presented herein ensures revocation of all the undesired tokens in a controlled manner over a period of time resulting in the protection of the system from DoS attacks.

Figure 3:
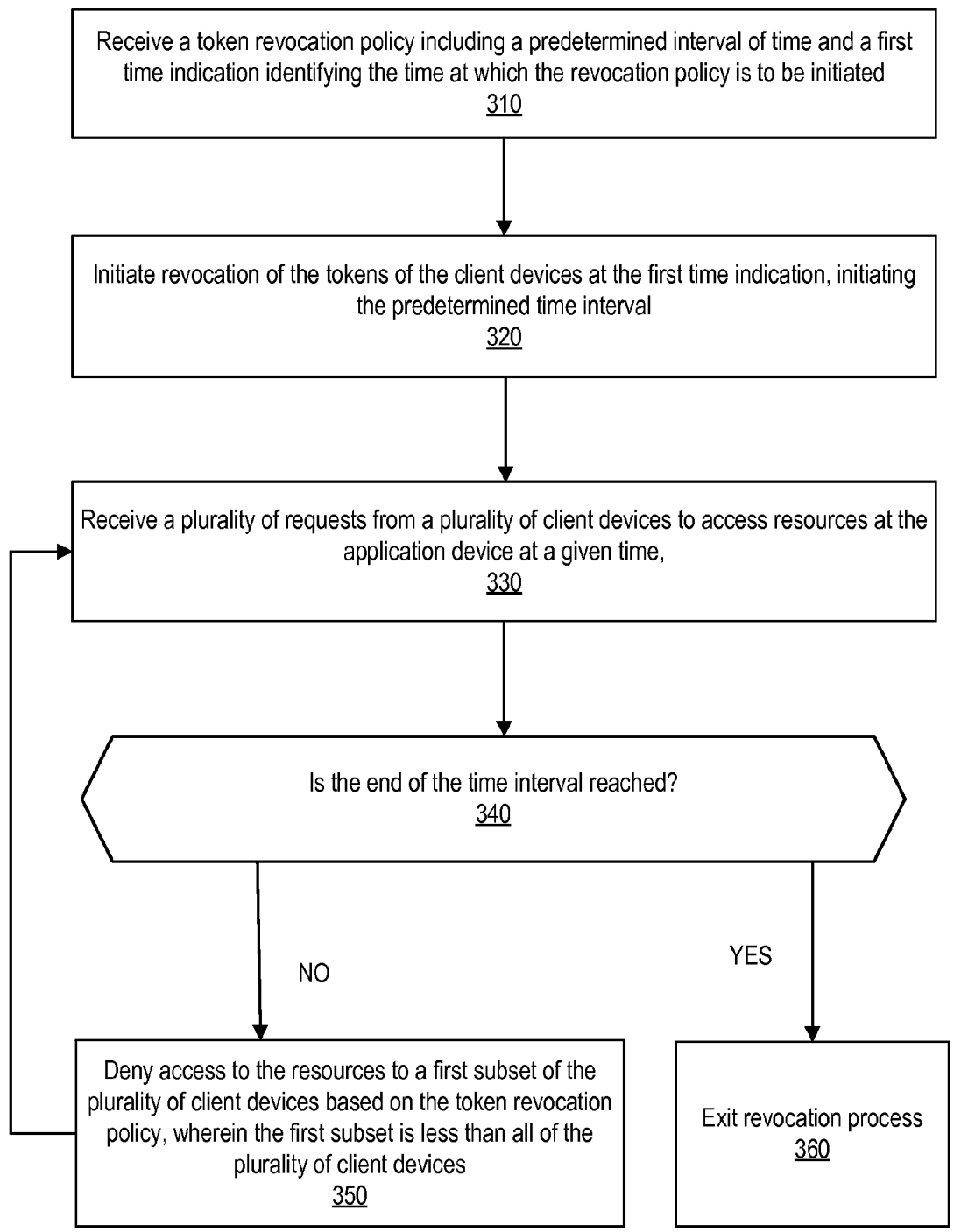
FIG. 3 illustrates a flow diagram of exemplary detailed operations for progressively revoking multiples tokens prior to the expiration of the tokens in accordance with some embodiments.

FIG. 3 illustrates a flow diagram of exemplary detailed operations for progressively revoking multiples tokens in accordance with some embodiments. In some embodiments, the revocation policy received at the servers 140 further includes a predetermined time interval and a start time, where the time interval defines a time period during which the revocation policy is to be performed. A block 310, the servers 140 receive a token revocation policy including a predetermined interval of time and a first time indication identifying the time at which the revocation policy is to be initiated. The revocation policy may also include a number of tokens to be revoked or a percentage of tokens to be revoked during or at a given time. At block 320, the servers 140 initiate revocation of the tokens of the client devices at the start time. Thus, the start time is used as a trigger to start applying the revocation policy. At block 330, the servers 140 receive at a given time multiple requests from the entire set of client devices 110 to access resources at the application device. The servers 140 determine, at block 340, whether the end of the time interval is reached. When the end of the time interval is not reached yet, the servers 140 deny access to the resources to a first subset of the client devices based on the token revocation policy. In an embodiment, the first subset is strictly less than all of the entire set of client devices.

In a non-limiting exemplary embodiment, a first number N or a percentage of client devices is denied access. This causes the N or percentage of client devices, to request a new token from the token authority 130. In some embodiments, the N client devices obtain N new tokens which are all issued at a time t_new which follows the start time at which the revocation process had started. In some embodiments, the start time is further used as a filtering criteria such that each request received at the servers 140 is checked to determine whether the token it includes was issued before or following the start time. In some embodiments, when a token is issued following the start time of the revocation policy, this is an indication that the token has already been revoked and does not need to be revoked a second time. Thus the server considers only client devices with tokens issued by the token authority prior to the start time of the revocation policy and further denies access to a subset of these client devices (e.g., a number N or a percentage). Flow then moves from block 350 to block 330 at which the servers 140 receive at a second given time multiple requests from the client devices 110 to access resources at the servers. The process of token revocation continues by denying access to a second subset of client devices. Referring back to FIG. 3, when the time interval is reached (at block 340) flow moves to block 360 and the revocation processed is ended.

The embodiments described herein present methods and systems for reliable token revocation. A token revocation service is used to configure one or more servers hosting application services to include a revocation policy. The revocation policy includes an identification of a set of one or more users for which tokens are to be revoked prior to their expiration. In some embodiments, the revocation policy includes identifiers individually identifying the users that need token revocation. In other embodiments, the revocation policy includes a number or percentage of users that need token revocation at a given time as well as a time interval during which the policy is to be active. In this embodiment, the servers hosting the application services, are caused to progressively revoke tokens (e.g., by revoking a subset of tokens at a time) until tokens of all users are revoked. The techniques presented herein ensures revocation of all the undesired tokens in a controlled manner over a period of time resulting in the protection of the system from DoS attacks.

Figure 4:
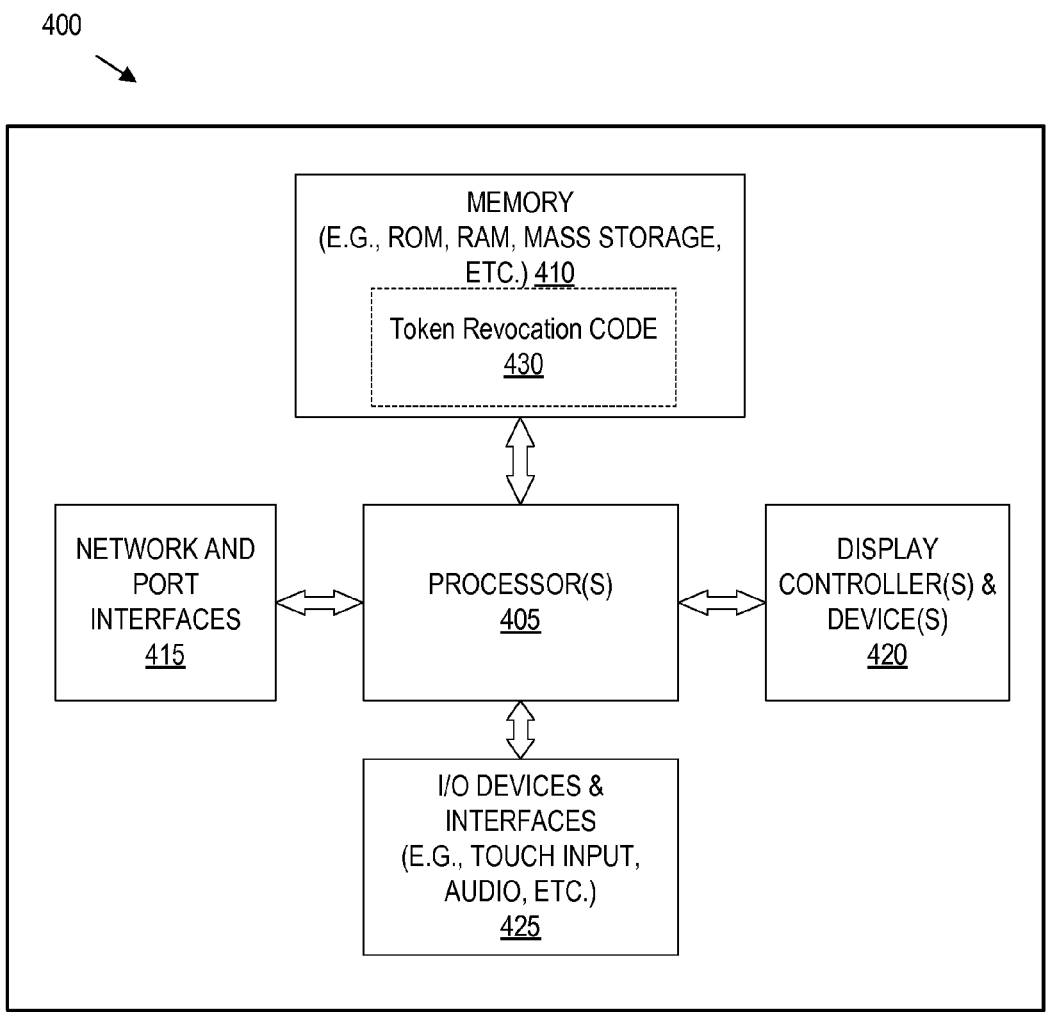
FIG. 4 is a block diagram illustrating an exemplary data processing system that may be used in some embodiments.

FIG. 4 illustrates a block diagram for an exemplary data processing system 400 that may be used in some embodiments. Data processing system 400 includes one or more microprocessors 405 and connected system components (e.g., multiple connected chips). Alternatively, the data processing system 400 is a system on a chip. One or more such data processing systems 400 may be utilized to implement the functionality of the client devices 110, the servers 140, the token authority 130 and the token revocation service 120, and the admin service 150 as illustrated in FIG. 1.

The data processing system 400 includes memory 410, which is coupled to the microprocessor(s) 405. The memory 410 may be used for storing data, metadata, and programs for execution by the microprocessor(s) 405. For example, the depicted memory 410 may store token revocation code 430 that, when executed by the microprocessor(s) 405, causes the data processing system 400 (e.g., servers 140) to perform a reliable token revocation as described with reference to FIGS. 1-3. The memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 410 may be internal or distributed memory.

The data processing system 400 also includes an audio input/output subsystem 415 which may include a microphone and/or a speaker for, for example, playing back music or other audio, receiving voice instructions to be executed by the microprocessor(s) 405, playing audio notifications, etc. A display controller and display device 420 provides a visual user interface for the user, e.g., GUI elements or windows.

The data processing system 400 also includes one or more input or output ("I/O") devices and interfaces 425, which are provided to allow a user to provide input to, receive output from, and otherwise transfer data to and from the system. These I/O devices 425 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 400.

The I/O devices and interfaces 425 may also include a connector for a dock or a connector for a USB interface, FireWire, Thunderbolt, Ethernet, etc., to connect the system 400 with another device, external component, or a network. Exemplary I/O devices and interfaces 425 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 400 with another device, external component, or a network and receive stored instructions, data, tokens, etc. It will be appreciated that one or more buses may be used to interconnect the various components shown in FIG. 4.

It will be appreciated that additional components, not shown, may also be part of the system 400, and, in certain embodiments, fewer components than that shown in FIG. 4 may also be used in a data processing system 400. For example, in some embodiments where the data processing system 400 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method at a server of progressively causing revocation of a plurality of tokens generated for a plurality of users of resources hosted at the server, the method including:
    a) receiving, a token revocation policy, which includes an identification of a set of one or more users for which a set of one or more associated tokens are to be revoked and a start time indicating a time at which revocation of tokens is to start at the server, wherein the set of tokens was generated at a token authority server in response to requests from one or more client devices for the set of users and enable the client devices to access resources at the server for determined periods of time identified by a set of expiration time intervals respectively associated with the set of tokens;
    b) receiving, from a first plurality of client devices, a first plurality of requests respectively including a first set of tokens from the plurality of tokens to access resources at the server at a first time, wherein each one from the first set of tokens is associated with an expiration time interval;
    c) determining, based on the token revocation policy, a first subset from the first plurality of client devices associated with a first subset from the first set of tokens, wherein a number of client devices in the first subset is strictly less than a total number of the first plurality of client devices and each one of the first subset from the first set of tokens has been issued prior to the start time;
    d) denying access to the resources hosted at the server to the first subset of client devices, which causes each one of the client devices from the first subset to request a new token from the token authority server prior to an expiration of the expiration time interval associated with each token from the first subset of tokens;
    e) receiving, from a second plurality of client devices, a second plurality of requests respectively including a second set of tokens to access resources at the server at a second time that occurs later than the first time, wherein each one from the second set of tokens is associated with an expiration time interval;
    f) determining, based on the token revocation policy, a second subset from the second plurality of client devices associated with a second subset from the second set of tokens, wherein a number of client devices in the second subset is strictly less than a total number of the second plurality of client devices and each one of the second subset from the second set of tokens has been issued prior to the start time;
    g) denying access to the resources hosted at the server to the second subset of client devices, which causes each one of the client devices from the second subset to request a new token from the token authority server prior to an expiration of the expiration time interval associated with each token from the second subset of tokens; and
    h) repeating (e) to (g) until at least one of the plurality of tokens generated for the plurality of users of resources hosted at the server is revoked and a predetermined time interval is reached.

2. The method of claim 1, wherein the identification of the set of users includes a predetermined number of users associated with a predetermined number of tokens to be revoked during a period of time, wherein the predetermined number of users is less than a total number of the users accessing the server through respective client devices during that period of time.

3. The method of claim 1, wherein the identification of the set of users includes a percentage of users for which associated tokens are to be revoked during a predetermined period of time, wherein the percentage is strictly less than one hundred percent.

4. A server for progressively revoking a plurality of tokens generated for a plurality of users of resources hosted at the server, the server comprising:
- a set of one or more processors; and
- a non-transitory machine-readable storage medium containing code, which when executed by the set of one or more processors, causes the server to:
  - a) receive, a token revocation policy, which includes an identification of a set of one or more users for which a set of one or more associated tokens are to be revoked and a start time indicating at time at which revocation of tokens is to start at the server, wherein the set of tokens was generated at a token authority server in response to requests from one or more client devices of the set of users and enable the client devices to access resources at the server for determined periods of time identified by a set of expiration time intervals respectively associated with the set of tokens;
  - b) receiving, from a first plurality of client devices, a first plurality of requests respectively including a first set of tokens from the plurality of tokens to access resources at the server at a first time, wherein each one from the first set of tokens is associated with an expiration time interval;
  - c) determining, based on the token revocation policy, a first subset from the first plurality of client devices associated with a first subset from the first set of tokens, wherein a number of client devices in the first subset is strictly less than a total number of the first plurality of client devices and each one of the first subset from the first set of tokens has been issued prior to the start time;
  - d) denying access to the resources hosted at the server to the first subset of client devices, which causes each one of the client devices from the first subset to request a new token from the token authority server prior to an expiration of the expiration time interval associated with each token from the first subset of tokens;
  - e) receiving, from a second plurality of client devices, a second plurality of requests respectively including a second set of tokens to access resources at the server at a second time that occurs later than the first time, wherein each one from the second set of tokens is associated with an expiration time interval;
  - f) determining, based on the token revocation policy, a second subset from the second plurality of client devices associated with a second subset from the second set of tokens, wherein a number of client devices in the second subset is strictly less than a total number of the second plurality of client devices and each one of the second subset from the second set of tokens has been issued prior to the start time; and
  - g) denying access to the resources hosted at the server to the second subset of client devices, which causes each one of the client devices from the second subset to request a new token from the token authority server prior to an expiration of the expiration time interval associated with each token from the second subset of tokens; and
  - h) repeating (e) to (g) until at least one of the plurality of tokens generated for the plurality of users of resources hosted at the server is revoked and a predetermined time interval is reached.

5. The server of claim 4, wherein the identification of the set of users includes a predetermined number of users associated with a predetermined number of tokens to be revoked during a period of time, wherein the predetermined number of users is less than a total number of the users accessing the server through respective client devices during that period of time.

6. The server of claim 4, wherein the identification of the set of users includes a percentage of users for which associated tokens are to be revoked during a predetermined period of time, wherein the percentage is strictly less than one hundred percent.

7. A non-transitory machine-readable storage medium having computer code stored therein, which when executed by a set of one or more processors of a server, causes the server to progressively revoke a plurality of tokens generated for a plurality of users of resources hosted at the server by performing operations comprising:
- a) receiving, a token revocation policy, which includes an identification of a set of one or more users for which a set of one or more associated tokens are to be revoked and a start time indicating at time at which revocation of tokens is to start at the server, wherein the set of tokens was generated at a token authority server in response to requests from one or more client devices of the set of users and enable the client devices to access resources at the server for determined periods of time identified by a set of expiration time intervals respectively associated with the set of tokens;
- b) receiving, from a first plurality of client devices, a first plurality of requests respectively including a first set of tokens from the plurality of tokens to access resources at the server at a first time, wherein each one from the first set of tokens is associated with an expiration time interval;
- c) determining, based on the token revocation policy, a first subset from the first plurality of client devices associated with a first subset from the first set of tokens, wherein a number of client devices in the first subset is strictly less than a total number of the first plurality of client devices and each one of the first subset from the first set of tokens has been issued prior to the start time;
- d) denying access to the resources hosted at the server to the first subset of client devices, which causes each one of the client devices from the first subset to request a new token from the token authority server prior to an expiration of the expiration time interval associated with each token from the first subset of tokens;
- e) receiving, from a second plurality of client devices, a second plurality of requests respectively including a second set of tokens to access resources at the server at a second time that occurs later than the first time, wherein each one from the second set of tokens is associated with an expiration time interval; and
- f) determining, based on the token revocation policy, a second subset from the second plurality of client devices associated with a second subset from the second set of tokens, wherein a number of client devices in the second subset is strictly less than a total number of the second plurality of client devices and each one of the second subset from the second set of tokens has been issued prior to the start time;

g) denying access to the resources hosted at the server to the second subset of client devices, which causes each one of the client devices from the second subset to request a new token from the token authority server prior to an expiration of the expiration time interval associated with each token from the second subset of tokens; and h) repeating (e) to (g) until at least one of the plurality of tokens generated for the plurality of users of resources hosted at the server is revoked and a predetermined time interval is reached.

8. The non-transitory computer readable storage medium of claim 7, wherein the identification of the set of users includes a predetermined number of users associated with a predetermined number of tokens to be revoked during a period of time, wherein the predetermined number of users is less than a total number of the users accessing the server through respective client devices during that period of time.

9. The non-transitory computer readable storage medium of claim 7, wherein the identification of the set of users includes a percentage of users for which associated tokens are to be revoked during a predetermined period of time, wherein the percentage is strictly less than one hundred percent.

* * * * *